US012296465B2

United States Patent
Souk (10) Patent No.: US 12,296,465 B2
(45) Date of Patent: May 13, 2025

(54) PARALLEL LINK ROBOT AND ROBOT SYSTEM

(71) Applicant: FANUC CORPORATION, Yamanashi (JP)

(72) Inventor: Hyunchul Souk, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/253,817

(22) PCT Filed: Feb. 15, 2022

(86) PCT No.: PCT/JP2022/005775
§ 371 (c)(1),
(2) Date: May 22, 2023

(87) PCT Pub. No.: WO2022/176819
PCT Pub. Date: Aug. 25, 2022

(65) Prior Publication Data
US 2024/0009865 A1  Jan. 11, 2024

(30) Foreign Application Priority Data
Feb. 18, 2021  (JP) ................. 2021-024120

(51) Int. Cl.
*B25J 17/02* (2006.01)
*B25J 9/10* (2006.01)

(52) U.S. Cl.
CPC ......... *B25J 17/0266* (2013.01); *B25J 9/1065* (2013.01)

(58) Field of Classification Search
CPC ...... B25J 17/0266; B25J 19/02; B25J 9/1065; B25J 9/0018
See application file for complete search history.

(56) References Cited

U.S. PATENT DOCUMENTS

| 4,552,502 A | 11/1985 | Harjar |
| 10,092,923 B2 * | 10/2018 | Kitamura ............. B25J 11/0075 |
| 10,137,566 B2 * | 11/2018 | Bastian, II ............... B25J 5/007 |
| 10,639,788 B2 * | 5/2020 | Wu ........................ B25J 9/1065 |

FOREIGN PATENT DOCUMENTS

| JP | S62199382 A | | 9/1987 | |
| JP | H03121792 A | * | 5/1991 | |
| JP | H08132366 A | | 5/1996 | |
| JP | 2009-255193 A | | 11/2009 | |
| JP | 2019119017 A | * | 7/2019 | .......... B25J 17/0266 |

* cited by examiner

*Primary Examiner* — Gregory Robert Weber
(74) *Attorney, Agent, or Firm* — Maier & Maier, PLLC (57) ABSTRACT

A parallel link robot includes a base unit, a movable part disposed below the base unit, a plurality of arms that connect the base unit and the movable part in parallel, and a wrist shaft that penetrates through the movable part along an axis extending in a vertical direction and is driven and rotated about the axis with respect to the movable part. A jig mount for detachably mounting a positioning jig is provided on one of an upper surface of the movable part and an upper portion of the wrist shaft exposed on the upper surface. A contact surface with which the positioning jig mounted on the jig mount makes contact is provided on the other one of the movable part and the wrist shaft, or a contact member having the contact surface can be detachably mounted onto the other one of the movable part and the wrist shaft.

3 Claims, 8 Drawing Sheets

PARALLEL LINK ROBOT AND ROBOT SYSTEM

TECHNICAL FIELD

The present disclosure relates to a parallel link robot and a robot system.

BACKGROUND

There is a known parallel link robot in which a pair of markers are respectively disposed on an upper surface of a movable part and on an outer peripheral surface of a wrist shaft supported on the movable part so as to be rotatable about a vertical axis (for example, see Japanese Unexamined Patent Application, Publication No. 2019-119017). Phase matching of the movable part and the wrist shaft is performed by an operator by rotating the wrist shaft with respect to the movable part and visually confirming that the pair of markers are in alignment. Since phase-matching can be performed from above the movable part, there is no need to remove tools such as hands attached to a wrist flange under the wrist shaft, and the phase matching can be easily performed.

SUMMARY

According to an aspect of the present disclosure, there is provided a parallel link robot including: a base unit; a movable part disposed below the base unit; a plurality of arms that connect the base unit and the movable part in parallel; and a wrist shaft that penetrates through the movable part along an axis extending in a vertical direction and that is driven and rotated about the axis with respect to the movable part. A jig mount for detachably mounting a positioning jig is provided on one of an upper surface of the movable part and an upper portion of the wrist shaft exposed on the upper surface. A contact surface with which the positioning jig mounted on the jig mount makes contact is provided on the other one of the movable part and the wrist shaft, or a contact member having the contact surface can be detachably mounted onto the other one of the movable part and the wrist shaft. In a state where the positioning jig mounted on the jig mount is in contact with the contact surface, a particular phase of the wrist shaft about the axis with respect to the movable part can be detected with the positioning jig.

DETAILED DESCRIPTION OF EMBODIMENTS

A parallel link robot 1 and a robot system 100 according to one embodiment of the present disclosure will now be described with reference to the drawings.

Figure 1:
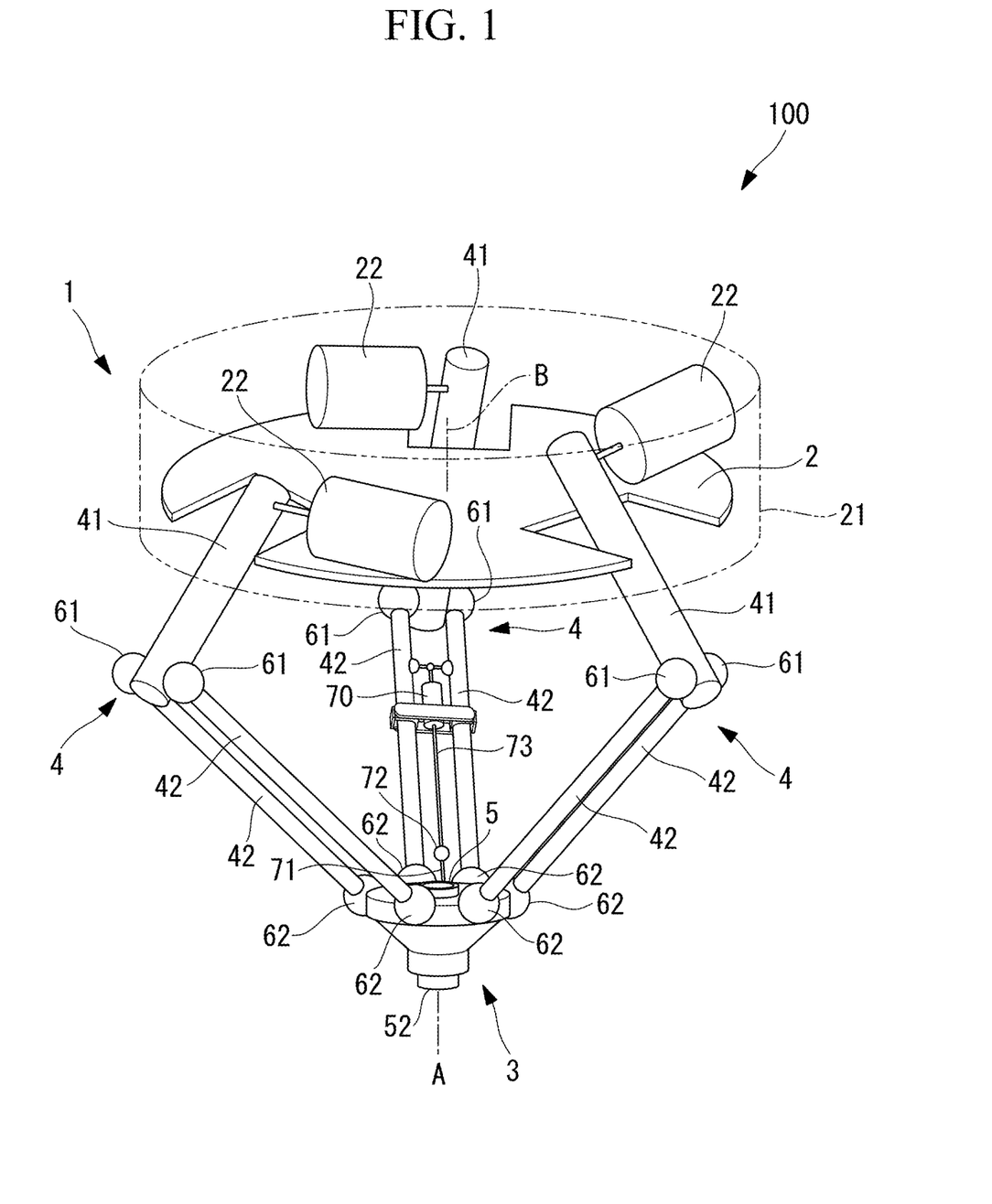
FIG. 1 is a perspective view of a parallel link robot according to one embodiment of the present disclosure.
Figure 2:
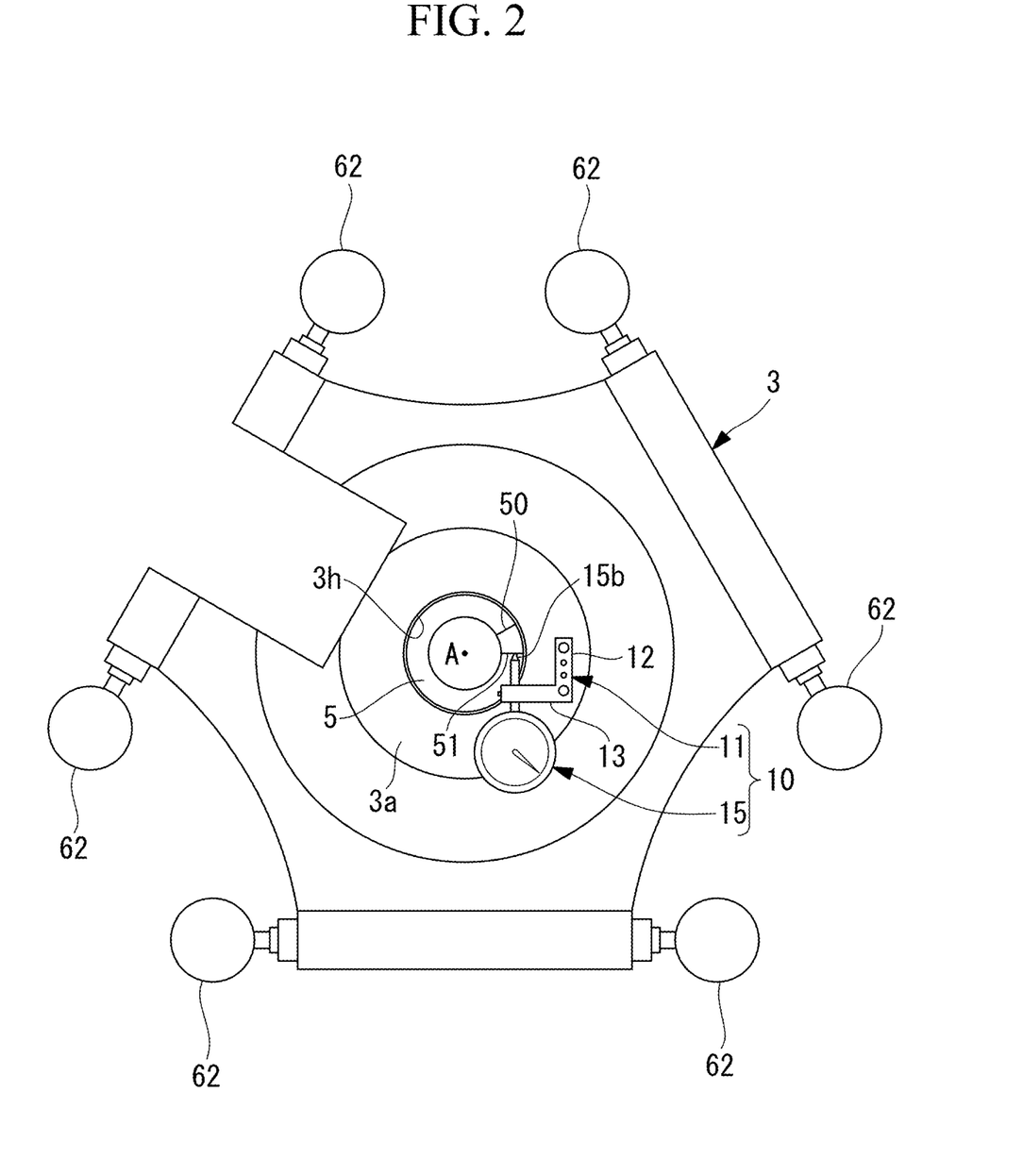
FIG. 2 is a plan view of a movable member illustrating a robot system of the present disclosure in which a positioning jig is mounted on the parallel link robot illustrated in FIG. 1.

As illustrated in FIGS. 1 and 2, the robot system 100 according to this embodiment includes a parallel link robot 1 and a positioning jig 10 detachably mounted on the parallel link robot 1.

As illustrated in FIG. 1, the parallel link robot 1 includes a base unit 2, a movable member (movable part) 3 that is disposed below the base unit 2 and has a flat upper surface, and three arms 4 that connect the base unit 2 and the movable member 3 in parallel. The parallel link robot 1 also includes a wrist shaft member (wrist shaft) 5 that is supported by the movable member 3 so as to be rotatable about a rotation axis (axis) A passing through the center of the movable member 3 in the vertical direction.

The base unit 2 includes three arm actuators 22 that respectively drive the three arms 4 and that are fixed to a housing 21 to be fixed to an external structure (not illustrated) such as a ceiling or a frame located above. The three arm actuators 22 are arranged to be equally spaced from each other in the circumferential direction about a vertical axis B passing through the center of the base unit 2.

Each of the arms 4 includes a drive link 41 having a first end fixed to a rotary drive shaft of one of the arm actuators 22, and two parallel passive links 42 each having a first end connected to a second end of the drive link 41 via a spherical bearing 61. One of the three arms 4 has a wrist actuator 70 mounted thereon. The wrist actuator 70 is connected to a gear 71, which rotates the wrist shaft member 5 described below, with a drive shaft 73 via a universal joint 72.

Figure 3:
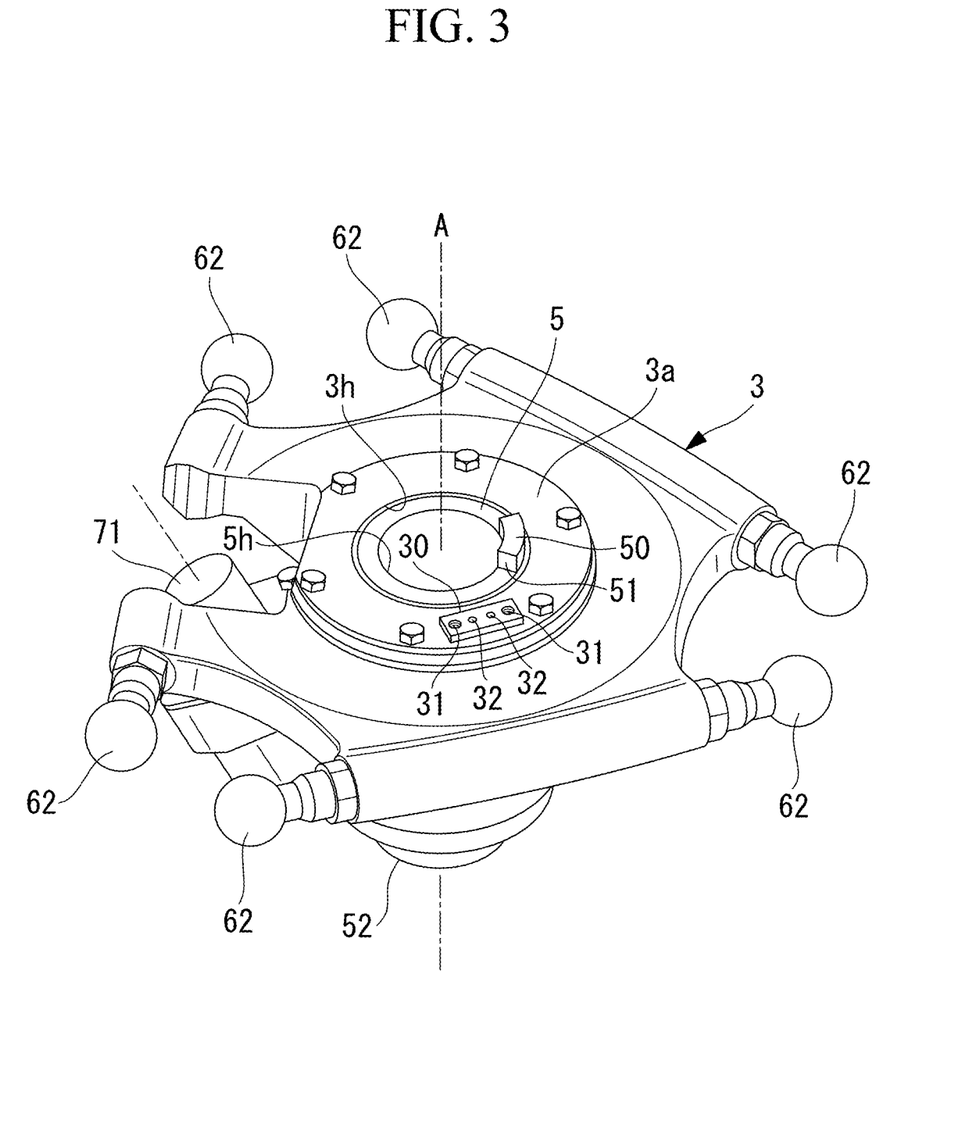
FIG. 3 is a perspective view of the movable member and the wrist shaft member illustrated in FIG. 1.

As illustrated in FIGS. 1 to 3, the movable member 3 has a ring shape having a hollow part 3h that extends along the rotation axis A. In addition, second ends of the passive links 42 of the arms 4 are connected to the movable member 3 via spherical bearings 62. In this manner, by controlling, in synchronization, the three arm actuators 22 disposed in the base unit 2, the movable member 3 is three-dimensionally moved while maintaining a horizontal posture.

As illustrated in FIG. 3, a mounting seat (jig mount) 30 that extends along a plane orthogonal to the rotation axis A is provided on the upper surface 3a of the movable member 3. The mounting seat 30 has two screw holes 31 and two pin holes 32 that extend parallel to the rotation axis A.

The wrist shaft member 5 is disposed in the hollow part 3h and is rotated about the rotation axis A with respect to the movable member 3 by a drive force transmitted from the wrist actuator 70 via the drive shaft 73, the universal joint 72, and the gear 71. The wrist shaft member 5 penetrates through the movable member 3 in a direction along the rotation axis A. An upper end thereof is exposed above the movable member 3, and a lower end thereof is exposed below the movable member 3.

A protrusion 50 formed by raising one portion of a cylindrical upper end portion in the circumferential direction is provided on the upper end of the wrist shaft member 5 exposed above the movable member 3. A contact surface 51 arranged along a plane that includes the rotation axis A is provided at one end of the protrusion 50 in the circumferential direction.

A flange 52 onto which a tool (not illustrated) such as a hand is to be mounted is provided at the lower end of the wrist shaft member 5. The wrist shaft member 5 has a center hole 5h that penetrates therethrough along the rotation axis A. Wire bodies such as tubes and cables (not illustrated) can be guided from the base unit 2 to the tool via the center hole 5h.

Figure 4:
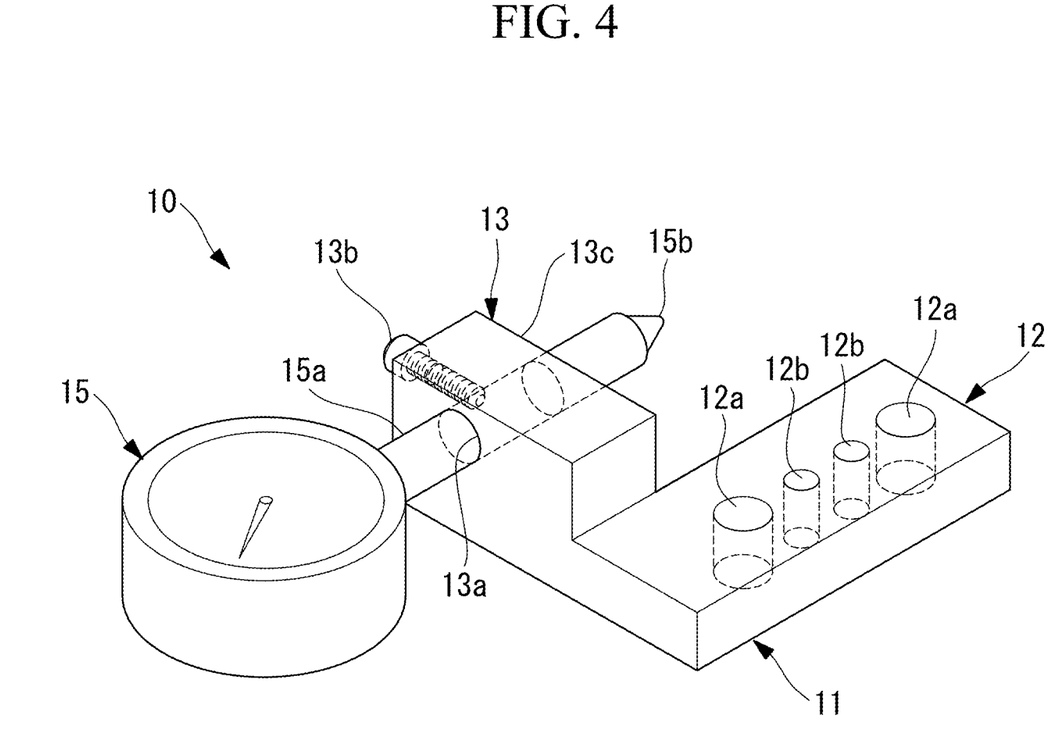
FIG. 4 is a perspective view of one example of the positioning jig of the robot system illustrated in FIG. 2.

As illustrated in FIGS. 2 to 4, the positioning jig 10 includes a bracket 11 mounted on the mounting seat 30 of the movable member 3, and a dial gauge (detector) 15 fixed to the bracket 11 in a positioned state.

The bracket 11 includes a flat plate-shaped mount portion 12 to be brought into close contact with the mounting seat 30, and a flat plate-shaped wall 13 onto which the dial gauge 15 is to be mounted and which is connected to the mount portion 12.

The mount portion 12 has two through holes 12a and two pin holes 12b that penetrate therethrough in the thickness direction. Furthermore, the wall 13 has a through hole 13a that penetrates therethrough in the thickness direction and that allows a stem 15a of the dial gauge 15 to pass through, and a screw hole (not illustrated) which penetrates into the inner surface of the through hole 13a from the outside of the wall 13 and into which a setscrew 13b is fastened.

By pressing the stem 15a, which penetrates through the through hole 13a in the wall 13, with the setscrew 13b fastened to the screw hole, the dial gauge 15 becomes fixed to the wall 13 while the longitudinal axis of the stem 15a extends in a direction orthogonal to a reference surface 13c of the wall 13. In this state, adjustment is made such that the dial gauge 15 reads zero when the amount by which a gauge head 15b at the tip of the stem 15a projects from the wall 13 reaches a particular amount.

In order to mount the positioning jig 10 onto the movable member 3, the mount portion 12 of the bracket 11 with the dial gauge 15 mounted thereon is brought into close contact with the mounting seat 30, and two pins (not illustrated) are respectively fitted into the pin hole 12b in the mount portion 12 and the pin hole 32 in the mounting seat 30. Next, two bolts (not illustrated) penetrating through the two through holes 12a in the mount portion 12 are fastened into the screw holes 31 in the mounting seat 30, as a result of which the bracket 11 becomes fixed to the mounting seat 30 in a positioned state.

In this state, the reference surface 13c of the wall 13 is separated from the contact surface 51 by a particular distance and is positioned to be parallel to the contact surface 51 when the phase of the wrist shaft member 5 about the rotation axis A with respect to the movable member 3 is matched with a particular phase. In this state, the gauge head 15b disposed at the tip side of the stem 15a of the dial gauge 15 is on the rotational trajectory of the contact surface 51 about the rotation axis A.

The operation of the parallel link robot 1 and the robot system 100 according to this embodiment having such features will now be described.

In order to phase-match the movable member 3 and the wrist shaft member 5 of the parallel link robot 1 about the rotation axis A, the positioning jig 10 is mounted onto the mounting seat 30 on the upper surface 3a of the movable member 3 by using two pins and bolts.

The two pins unambiguously determine the position of the dial gauge 15 in a direction along the mounting seat 30. In other words, the longitudinal axis of the stem 15a of the dial gauge 15 is disposed on the rotational trajectory of the protrusion 50 on the wrist shaft member 5 and along the tangent line of the rotational trajectory.

In this state, the wrist shaft member 5 is rotated about the rotation axis A with respect to the movable member 3 so as to bring the contact surface 51 of the protrusion 50 into contact with the gauge head 15b of the dial gauge 15. Next, the rotation of the wrist shaft member 5 is stopped at a position where the dial gauge 15 reads zero, as a result of which the phase of the wrist shaft member 5 with respect to the movable member 3 can be highly accurately matched with a particular phase.

Then, in this state, by setting the phase of the wrist shaft member 5 about the rotation axis A with respect to the movable member 3 to 0° for a controller (not illustrated) that controls the parallel link robot 1, phase matching of the movable member 3 and the wrist shaft member 5 is completed.

In such a case, according to the present embodiment, phase matching of the movable member 3 and the wrist shaft member 5 can be performed by using the positioning jig 10 fixed to the upper surface 3a of the movable member 3. This provides an advantage in that the operator can easily perform phase matching highly accurately by using the positioning jig without having to remove the tool mounted on the flange 52.

Here, in the present embodiment, the positioning jig 10 is fixed to the mounting seat 30 with two bolts; alternatively, one bolt may be used for fixing.

Furthermore, in the present embodiment, two pins are used to position the positioning jig 10 with respect to the mounting seat 30. Alternatively, one locating surface against which the bracket 11 abuts in a direction along the mounting seat 30 and one pin, or two locating surfaces against which the bracket 11 abuts in two directions along the mounting seat may be used for positioning.

Figure 5:
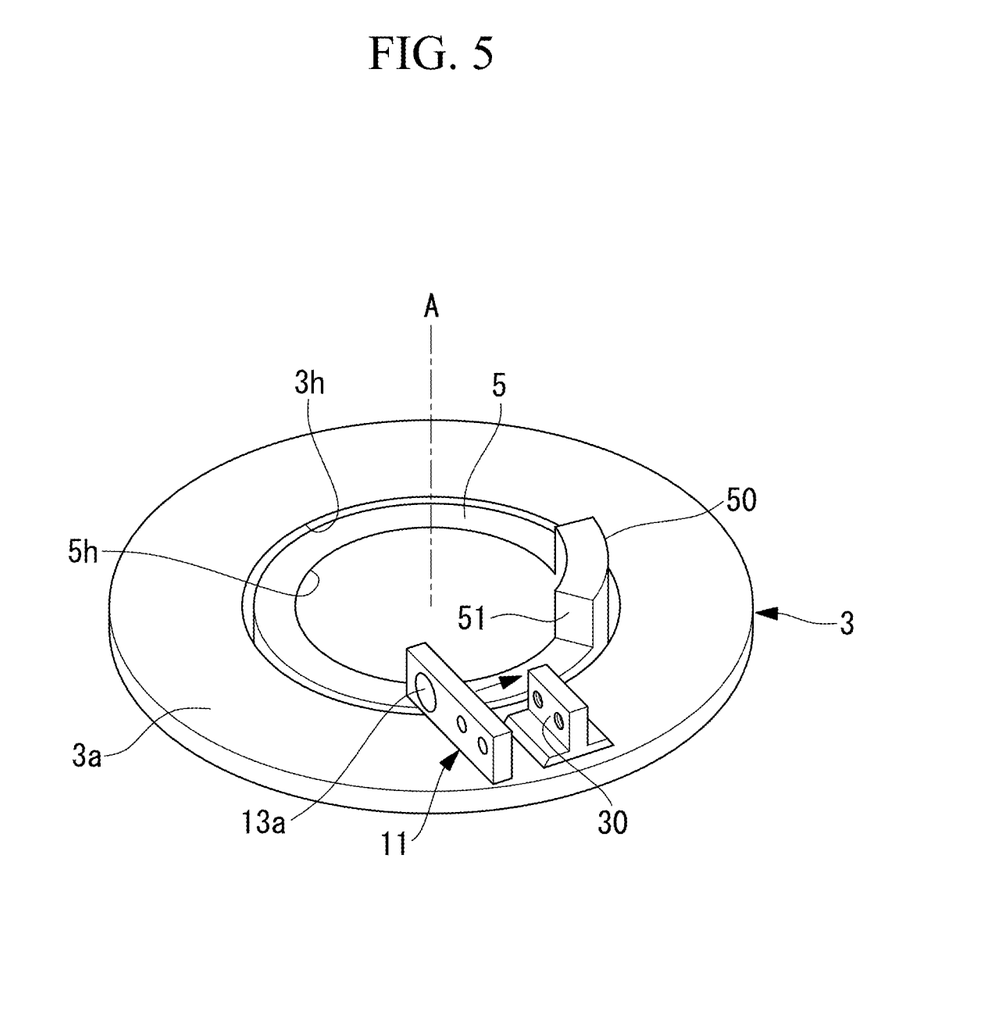
FIG. 5 is an exploded perspective view illustrating a method for mounting a bracket onto a movable member of a parallel link robot according to a first modified example of the robot system illustrated in FIG. 2.

In the present embodiment, the mounting seat 30 is arranged along a plane orthogonal to the rotation axis A; alternatively, as illustrated in FIG. 5, a mounting seat 30 parallel to the plane including the rotation axis A may be employed. In this case, the bracket 11 can be configured as a simple flat plate shape and the pin or locating surface for positioning can be omitted.

Figure 6:
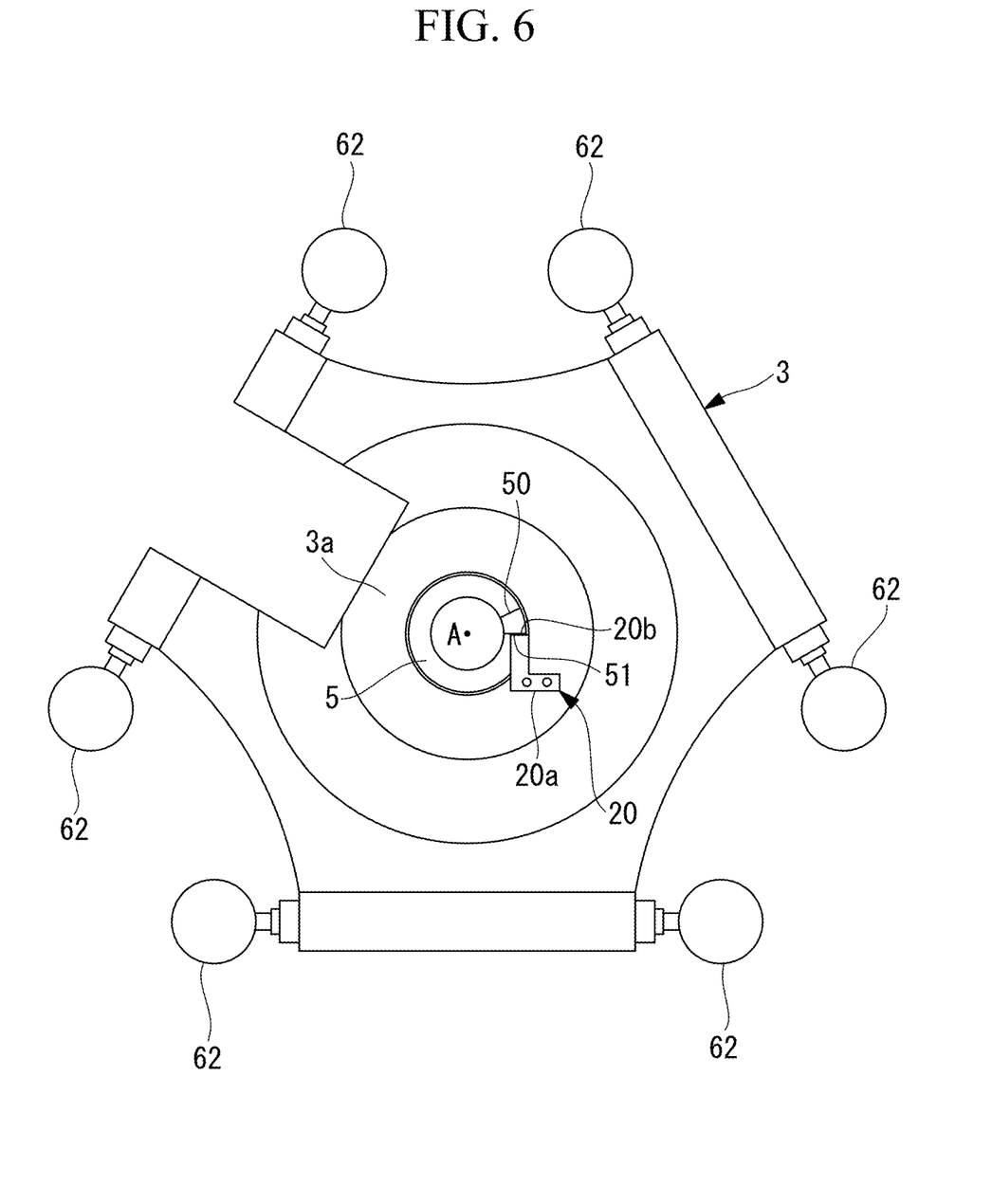
FIG. 6 is a plan view of the movable member according to a second modified example of the robot system illustrated in FIG. 2.

In addition, the positioning jig 10 including the dial gauge 15 is described as an example in the present embodiment; alternatively, as illustrated in FIG. 6, the positioning jig may be constituted by a block 20 that directly abuts against the contact surface 51.

The block 20 includes a mount portion 20a for fixing the block 20 to the mounting seat 30 on the upper surface 3a of the movable member 3 in a positioned state. Furthermore, the block 20 includes a locating surface (locating member) 20b that abuts against the contact surface 51 when the wrist shaft member 5 is arranged in a particular phase about the rotation axis A with respect to the movable member 3 in a state where the block 20 is fixed to the mounting seat 30.

In the state where the block 20 is fixed to the mounting seat 30 in a positioned state, the contact surface 51 is brought close to the locating surface 20b of the block 20 by rotating the wrist shaft member 5 about the rotation axis A with respect to the movable member 3. When the locating surface 20b abuts against the contact surface 51, the wrist shaft member 5 is phase-matched at a particular phase with respect to the movable member 3. The operator can intuitively confirm phase matching through the contact between the contact surface 51 and the locating surface 20b.

Although FIG. 6 illustrates the block 20 having an L shape, the shape is not limited to this, and the block 20 may take any form as long as the mount portion 20a and the locating surface 20b described above are included.

Figure 7:
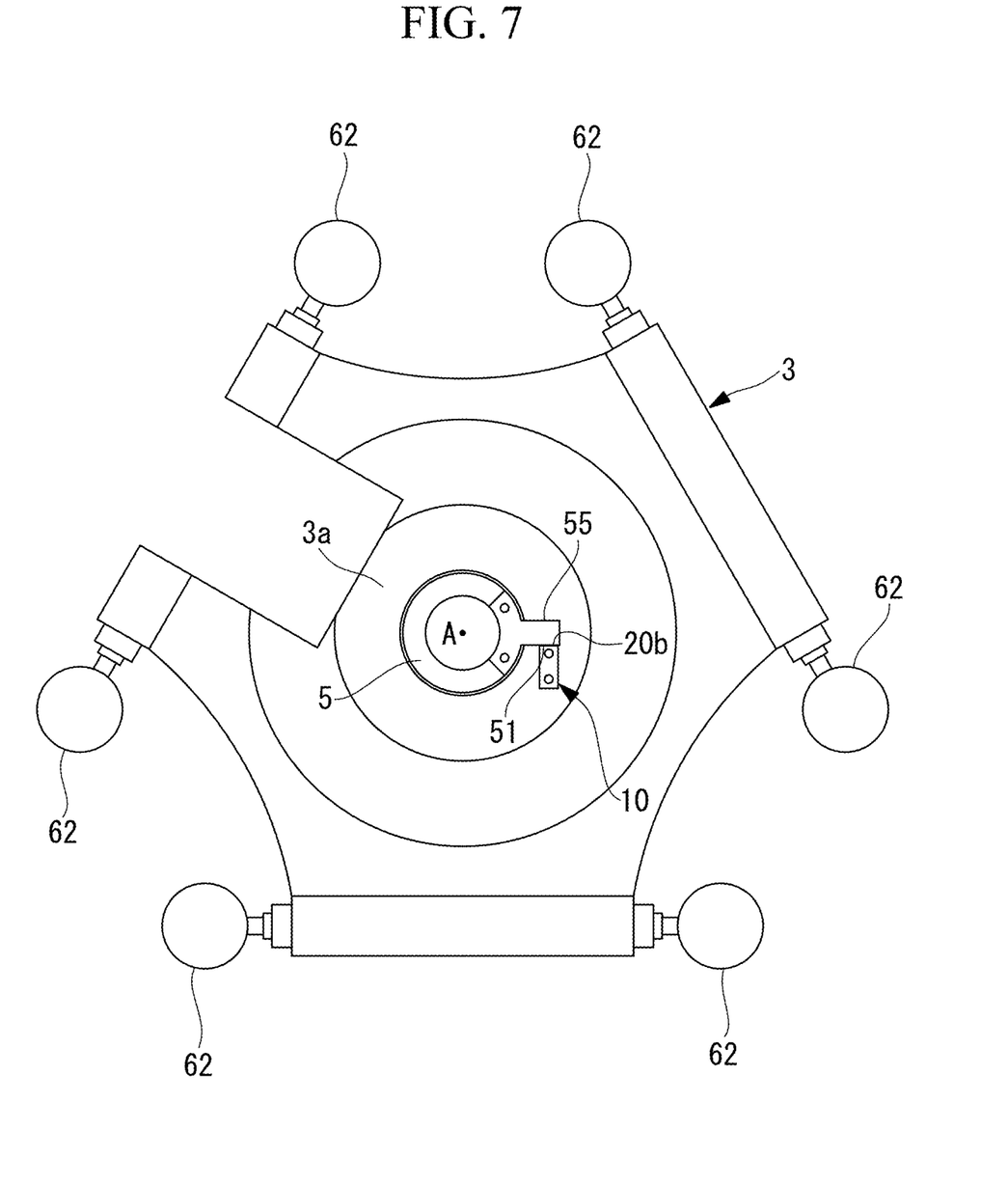
FIG. 7 is a plan view of the movable member according to a third modified example of the robot system illustrated in FIG. 2.

Furthermore, in the present embodiment, the contact surface 51 is provided on the protrusion 50 protruding upward from the upper end of the wrist shaft member 5. Alternatively, as illustrated in FIG. 7, the contact surface 51 may be provided in a contact member 55 detachably mounted on the upper end of the wrist shaft member 5 in a positioned state. The contact member 55 may have a cantilever shape extending radially outward from the outer peripheral surface of the upper end of the wrist shaft member 5.

In this manner, the dial gauge 15 of the positioning jig or the locating surface 20b can be brought into contact with the contact surface 51 at a position remote from the outer surface of the wrist shaft member 5 in a radially outward direction. By distancing the contact position of the contact surface 51 and the positioning jig 10 from the rotation axis A, the amount by which the contact surface 51 travels with respect to the rotation angle can be increased, and the accuracy of phase matching can be improved.

Although the member mounted on the upper end of the wrist shaft member 5 is the contact member 55 and the member mounted on the upper surface 3a of the movable member 3 is positioning jig 10 in this case, the functions of the contact member 55 and the positioning jig 10 may be interchanged. That is, a member that is mounted on the upper end of the wrist shaft member 5 and has a cantilever shape extending radially outward may be used as the positioning jig 10, and the member mounted on the upper surface of the movable member 3 may be used as the contact member 55. In such a case, the mounting seat 30 for mounting the positioning jig 10 is disposed on the upper surface of the wrist shaft member 5.

Figure 8:
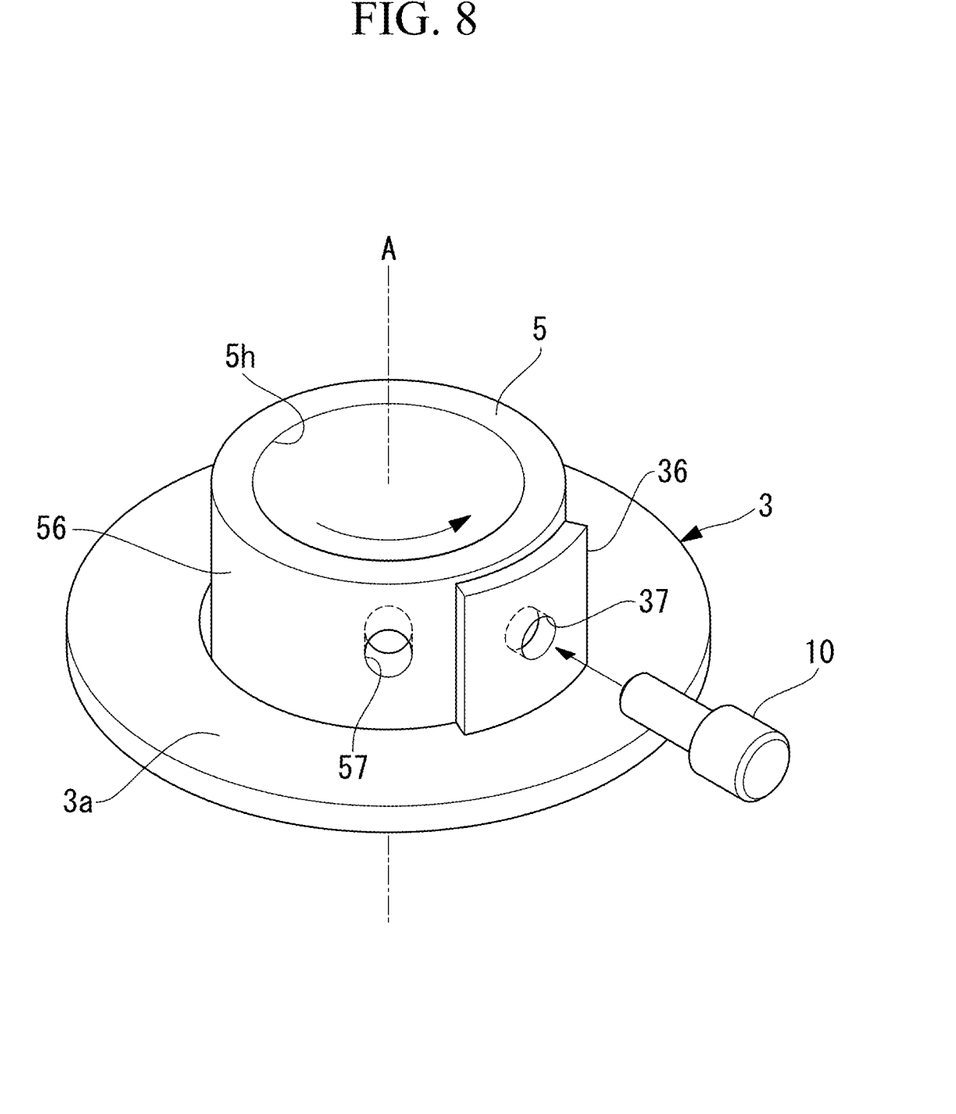
FIG. 8 is a partial perspective view of the movable member according to a fourth modified example of the robot system illustrated in FIG. 2.

As illustrated in FIG. 8, a wall 36 adjacent to an outer peripheral surface (wall) 56 of the wrist shaft member 5 with a small gap therebetween in the radially outward direction may be provided on the movable member 3, and pin holes 57 and 37 that penetrate through the wrist shaft member 5 and the wall 36 in the radial direction and are arranged coaxially in a particular phase may be provided in the wrist shaft member 5 and the wall 36. In addition, a pin that movably fits into the pin holes 57 and 37 in the axis direction may be employed as the positioning jig 10.

In such a case, for example, the positioning jig 10 may be fitted into the pin hole 37 in the wall 36 in advance, the wrist shaft member 5 may be rotated with respect to the movable member 3, and when the positioning jig 10 can also fit into the pin hole 57 in the wrist shaft member 5, the wrist shaft member 5 and the movable member 3 are matched at a particular phase. In such a case, the inner peripheral surface of the pin hole 57 in the wrist shaft member 5 functions as the contact surface with which the pin serving as the positioning jig 10 makes contact.

The operator can easily confirm completion of the phase matching when the positioning jig 10 is simultaneously fitted into the two pin holes 37 and 57.

The wall 36 may be provided in one portion or throughout the circumferential direction about the rotation axis A. As in FIG. 3, the bracket 11 that constitutes the wall 36 having a pin hole may be mounted on the mounting seat 30 on the movable member 3 in a positioned state.

The invention claimed is:

1. A parallel link robot comprising:
a base unit;
a movable part disposed below the base unit;
a plurality of arms that connect the base unit and the movable part in parallel; and
a wrist shaft that penetrates through the movable part along an axis extending in a vertical direction and that is driven and rotated about the axis with respect to the movable part,
wherein a jig mount for detachably mounting a positioning jig is provided on one of an upper surface of the movable part and an upper portion of the wrist shaft exposed on the upper surface,
a contact surface with which the positioning jig mounted on the jig mount makes contact is provided on the other one of the movable part and the wrist shaft, or a contact member having the contact surface can be detachably mounted onto the other one of the movable part and the wrist shaft, and
in response to rotating the wrist shaft about the axis with respect to the movable part while the positioning jig mounted on the jig mount is in contact with the contact surface, a particular phase of the wrist shaft about the axis with respect to the movable part is detected with the positioning jig.

2. A robot system comprising:
the parallel link robot according to claim 1; and
the positioning jig mounted on the jig mount.

3. The robot system according to claim 2, wherein
the positioning jig includes a dial gauge having a gauge head, and
in response to rotating the wrist shaft about the axis with respect to the movable part while the gauge head is in contact with the contact surface, the particular phase is detected with a reading of the dial gauge.

* * * * *